United States Patent
Maile et al.

(10) Patent No.: US 7,431,675 B2
(45) Date of Patent: Oct. 7, 2008

(54) CHAIN TENSIONER

(75) Inventors: Kevin Maile, Grays (GB); Jonathan Coles, Guildford (GB); Michael Cade, Welwyn Garden (GB)

(73) Assignee: Ford Global Technologies, LLC, Dearborn, MI (US)

( * ) Notice: Subject to any disclaimer, the term of this patent is extended or adjusted under 35 U.S.C. 154(b) by 120 days.

(21) Appl. No.: 11/420,044

(22) Filed: May 24, 2006

(65) Prior Publication Data

US 2006/0270501 A1 Nov. 30, 2006

(30) Foreign Application Priority Data

May 24, 2005 (GB) .................................. 0510482.3

(51) Int. Cl.
*F16H 7/08* (2006.01)
(52) U.S. Cl. ..................................... 474/110
(58) Field of Classification Search ................. 474/101, 474/109, 110, 111, 140
See application file for complete search history.

(56) References Cited

U.S. PATENT DOCUMENTS

| | | | | |
|---|---|---|---|---|
| 4,371,360 A | * | 2/1983 | Ojima et al. ................. | 474/111 |
| 5,030,169 A | * | 7/1991 | Kiso et al. ................... | 474/110 |
| 5,055,089 A | * | 10/1991 | Ojima ......................... | 474/138 |
| 5,649,878 A | * | 7/1997 | Noguchi et al. ............. | 474/110 |
| 5,700,215 A | * | 12/1997 | Tada et al. ................... | 474/110 |
| 6,105,549 A | * | 8/2000 | Moser ...................... | 123/198 R |
| 6,450,908 B2 | * | 9/2002 | Ishii et al. ................... | 474/138 |
| 6,547,684 B2 | | 4/2003 | Kurohata | |
| 6,612,951 B2 | | 9/2003 | Kurohata | |
| 7,048,662 B2 | * | 5/2006 | Maino ........................ | 474/110 |
| 7,077,772 B2 | * | 7/2006 | Hashimoto et al. .......... | 474/109 |
| 2003/0125142 A1 | | 7/2003 | Hashimoto et al. | |
| 2004/0127316 A1 | | 7/2004 | Hashimoto et al. | |
| 2005/0049093 A1 | * | 3/2005 | Sato et al. ................... | 474/101 |

FOREIGN PATENT DOCUMENTS

ES 8102304 6/1980
JP 58008211 A * 1/1983

* cited by examiner

*Primary Examiner*—Vicky A Johnson
(74) *Attorney, Agent, or Firm*—Julia Voutyras; Allan J. Lippa

(57) ABSTRACT

A ratchet tensioner is disclosed for a chain enclosed within a casing that does not have a removable cover. The tensioner including a body for mounting on the exterior of the casing, a plunger slidably mounted in the body and urged in use into the interior of the casing to deflect a run of the chain laterally in order to increase tension in the chain. The plunger is formed with ratchet teeth which interact with a pawl that is pivotably mounted on the body to permit movement of the plunger only in the direction to increase chain tension. In the invention, a pin is provided for inhibiting pivoting movement of the pawl during installation of the tensioner, the pin being retractable from outside the casing in order to free the pawl after the tensioner has been mounted on the casing.

1 Claim, 1 Drawing Sheet

CHAIN TENSIONER

FIELD OF THE INVENTION

The present invention relates to a tensioner for a continuous drive element, hereinafter referred to simply as a "chain" though in the present context this term should be construed to include a belt.

BACKGROUND AND SUMMARY OF THE INVENTION

Hydraulic tensioners are commonly used to dampen excessive vibrations in the camshaft drive chain of an engine, more commonly termed the timing chain. Because the timing chain is subjected to torque reversals during normal operation, it is known for the tensioning device to incorporate a ratchet mechanism that allows a plunger tensioning the chain to move only in the direction to increase the tension in the chain. Ratchet tensioners of this type are disclosed in U.S. Pat. Nos. 6,547,684 and 6,612,951.

During installation of such a ratchet tensioner, the plunger needs to be fully retracted for later release after the tensioner has been mounted on the engine. If the ratchet mechanism were to be allowed to operate normally during installation, it would extend the plunger to the maximum of its stroke and prevent the tensioner from being installed.

Conventionally, the timing chain is housed in a casing with a removable cover which allows access to the chain tensioner while it is in situ in the engine. It is therefore possible to access the part of the tensioner that is within the casing to release the ratchet mechanism after it has been installed and both of the prior art references mentioned above incorporate ratchet release mechanisms that are suitable for use in such conventional engines.

More recently, however, it has been proposed to form engine castings in such a manner that the chamber within which the timing chain is encased forms an integral part of the engine block and the engine cylinder head and there is no cover that can be removed to expose the chain or the chain tensioner.

The present invention seeks to provide a ratchet tensioner that may be used in such engine.

According to the present invention, there is provided a tensioner for a chain enclosed within a casing, the tensioner comprising a body for mounting on the exterior of the casing, a plunger slidably mounted in the body and urged in use into the interior of the casing to deflect a run of the chain laterally in order to increase tension in the chain, wherein the plunger is formed with ratchet teeth which interact with a pawl that is pivotably mounted on the body to permit movement of the plunger only in the direction to increase chain tension, wherein a device is provided to act on the pawl so as to inhibit pivoting movement of the pawl and thereby prevent movement of the plunger during installation of the tensioner, said device operable from outside the casing in order to free the pawl after the tensioner has been mounted on the casing.

In the preferred embodiment of the invention, the device for inhibiting pivoting movement of the pawl comprises a pin that is retractable from outside the casing.

The plunger may be urged in the direction of the chain by a spring or a hydraulic pressure but more preferably by both.

The pin is advantageously arranged to act on the pawl by way of a spring that is fully compressed by the pin during installation, the spring serving to bias the pawl resiliently into engagement with the ratchet teeth on the plunger when the pin is retracted.

The pin may be retracted by a cross bolt mounted in the body transversely to the axis of the pin, the bolt having a necked or waisted shank comprising a large diameter portion connected by a conical region to a reduced diameter portion.

When the end of the pin contacts the cylindrical surface of the large diameter portion of the shank, it is pushed into the position in which it locks movement of the pawl. However, as the bolt is driven home into the body, the end of the pin becomes aligned first with the conical region then with the reduced diameter portion of the shank and is thus allowed to retract away from the pawl. The conical region makes the transition gradual and allows the pawl to be re-locked if necessary.

The use of a cross bolt offers the advantages that it can readily be screwed tight using powered assembly tools and that it provides visual confirmation that the ratchet mechanism has been released.

BRIEF DESCRIPTION OF THE DRAWINGS

The invention will now be described further, by way of example, with reference to the accompanying drawings, in which.

DETAILED DESCRIPTION OF THE PREFERRED EMBODIMENT

Figure 1:
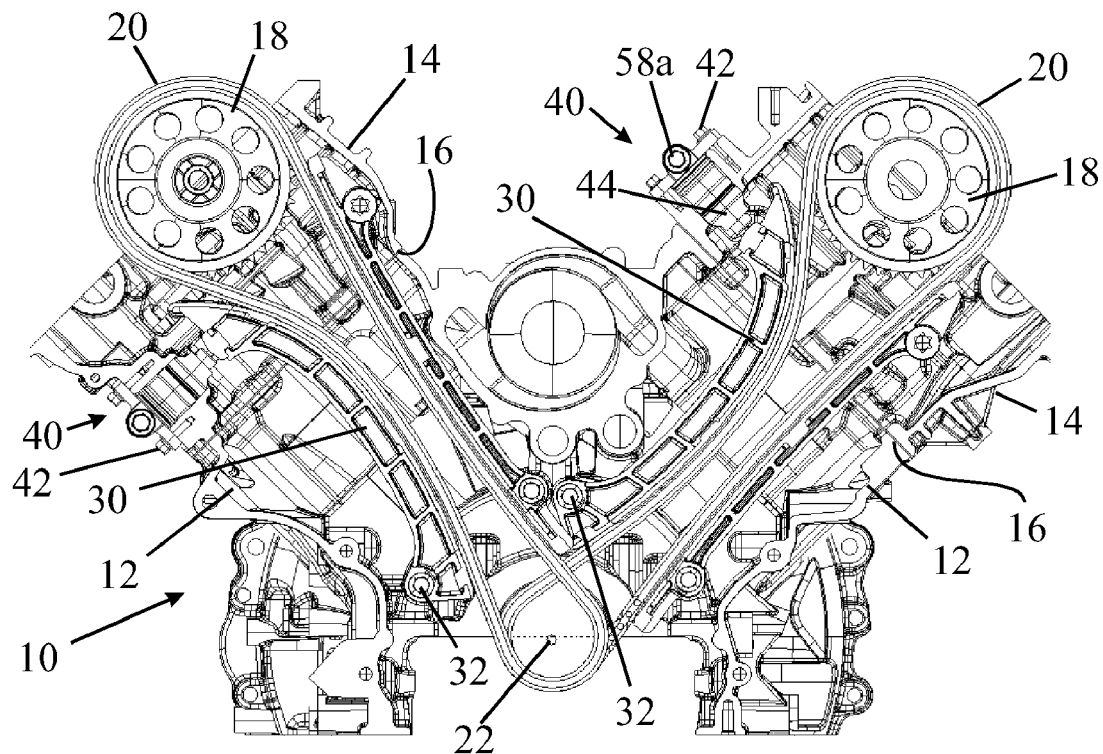
FIG. 1 is a section through the front of V-engine engine, the section plane passing through the casing within which the timing chains are enclosed.

The "V" engine 10 in FIG. 1 has two banks 12 of cylinders and two cylinder heads 14. The split planes at which the cylinder heads meet the cylinder block are designated 16. A camshaft driven by a pulley 18 is journalled in each cylinder head 14 to operate gas exchange valves. Each pulley 18 is engaged by a respective timing chain 20 that is driven by the engine crankshaft. The crankshaft, which is not shown in the drawing, rotates about an axis 22.

Figure 2:
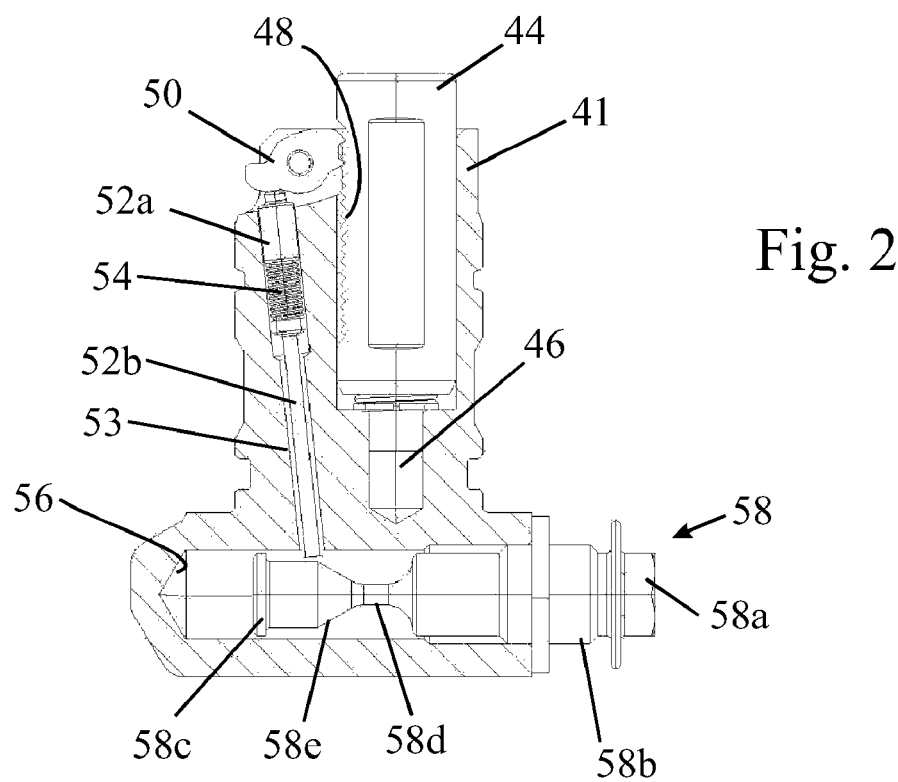
FIG. 2 is a schematic section through a ratchet tensioner of the present invention.

To maintain each timing chain 20 in tension, an arcuate shoe 30 is mounted on each engine block for pivotal movement about a pin 32. The end of each shoe 30 remote from the pivot pin 32 is urged towards the adjacent run of the timing chain 20 by a respective tensioner 40 that is bolted onto the outside of the casing of the timing chains 20. The tensioner of the invention, which will be described in more detail by reference to FIG. 2, is secured to the casing by means of bolts 42. The tensioners 40 are secured to the cylinder head castings in the case of the illustrated embodiment, but they may alternatively be mounted on the engine block.

Referring now to FIG. 2, each tensioner has a body 41 that passes through a hole in the cylinder head casting into the timing chain casing. A plunger 44 slidably mounted in the body 41 is urged by the hydraulic pressure within a chamber 46 towards the shoe 30 that tensions the timing chain 20. The chamber 46 is supplied with oil from an engine driven oil pump and a spring (not shown) may also be arranged in the chamber 46 to tension the timing chain 20 when the engine oil pressure is low, such as during the first engine start up after installation of the tensioner 40.

The plunger 44 is formed with ratchet teeth 48 that are engaged by a spring biased pawl 50 mounted on the body 41 of the tensioner 40. The pawl and ratchet allow the plunger 44 to move only in the direction that increases chain tension, that is to say upwards as viewed in FIG. 2.

As so far described, the tensioner does not differ in principle from the tensioner described, for example, in U.S. Pat. No. 6,547,684 except for the fact that the tensioner is mounted on the outside of the casing of the timing chain rather than inside it. The reason for this is that the tensioner described in the prior art is designed for use in an engine in which a cover of the timing chain casing can be removed to allow access to the tensioner. Hence, after it has been fitted to the engine with its plunger held fully retracted, the ratchet tensioner disclosed in the prior art remains accessible to allow the pawl or the plunger to be released so that the tensioner can function normally. By contrast, the tensioner of the present invention is designed for use with an engine in which the casing enclosing the timing chain is cast as part of the cylinder block and the cylinder head. As such, the interior of the timing chain casing is not accessible.

The tensioner shown in FIG. 2 is therefore constructed in such a manner that the pawl 50 of the ratchet 48 can be released from outside the timing chain casing. A pin guided in a bore 53 in the body 41 is formed in two sections 52a and 52b separated from one another by means of a coil spring 54. The end of the section 52b of the pin extends into a transverse bore 56 in the body 41 which receives a cross bolt 58. The cross bolt 58 has a head 58a, a screw thread 58b and a necked or waisted shank. In particular, the shank has a large diameter portion 58c connected to a reduced diameter portion 58d by a conically tapering portion 58e.

The tensioner is installed into an engine in the condition shown in FIG. 2. The cross bolt is unscrewed from the body so that the end of the pin section 52b rides on the large diameter portion 58c of the shank of the cross bolt 58. The pin section 52b is therefore urged towards the pawl 50 and fully compresses the spring 54 so that its coils touch. This prevents any movement of the pawl 50 and therefore locks the ratchet mechanism in the illustrated position in which the plunger 44 is fully retracted.

After the tensioner has been mounted on the engine by means of the bolts 42 (not visible in the section plane of FIG. 2), the cross bolt 58 is screwed in to its full extent. In the process, the pin section 52b slides gradually down the conical section 58e until it rests on the reduced diameter portion 58d of the shank of the bolt 58. As the pin section 52b moves away from the pawl 50, it allows the coils of the spring 54 to separate so that the spring 54 now functions normally to bias the pawl 50 in a clockwise direction, as viewed. If the plunger is now pushed outwards by the hydraulic pressure and/or the spring in the chamber 46, the pawl 50 can pivot anticlockwise against the action of the spring 54 in order to permit movement of the plunger 44. Movement of the plunger in the opposite direction, on the other hand, is prevented by the pawl 50. In this way, the timing chain is tensioned and the tension is maintained even during reversal of the torque transmitted through the chain.

It will be seen from FIG. 1 that the heads 58a of the bolts 58 can be seen and readily accessed from the front of the engine. The fact that they can be accessed readily simplifies assembly and the substantial size of the head 58a eases the task of tightening the bolt 58 using spanners of a size conventionally found on an assembly line. The fact that the bolts can also be seen provides simple visual confirmation that the ratchet tensioners have been released.

This concludes the description of the invention. The reading of it by those skilled in the art would bring to mind many alterations and modifications without departing from the spirit and the scope of the invention. Accordingly, it is intended that the scope of the invention be defined by the following claims:

The invention claimed is:

1. A tensioner for a chain enclosed within a casing, the tensioner comprising:
    a body for mounting on the exterior of the casing;
    a plunger slidably mounted in said body and urged in use into the interior of said casing to deflect a run of a chain laterally in order to increase tension in said chain, wherein said plunger is formed with ratchet teeth which interact with a pawl that is pivotably mounted on said body to permit movement of said plunger only in the direction to increase chain tension, said plunger urged in the direction of said chain by at least one of a spring and a hydraulic pressure;
    a device for inhibiting pivoting movement of said pawl and thereby preventing movement of said plunger during installation of said tensioner, said device operable from outside said casing in order to free said pawl after said tensioner has been mounted on the casing, said device comprising:
        a pin that is retractable from outside the casing, said pin arranged to act on said pawl by way of a spring that is fully compressed by said pin during installation, said spring serving to bias said pawl resiliently into engagement with the ratchet teeth on said plunger when said pin is retracted; and
    a cross bolt for retracting said pin mounted in said body transversely to the axis of said pin, said bolt having a necked or waisted shank formed of a large diameter portion connected by a conical region to a reduced diameter portion.

* * * * *